United States Patent [19]

Rochling et al.

[11] 3,928,345

[45] Dec. 23, 1975

[54] BIS-TRIAZINOBENZIMIDAZOLES AND THEIR PREPARATION

[75] Inventors: Hans Rochling, Altenhain, Taunus; Kurt Hartel; Reinhard Kirsch, both of Hofheim, Taunus, all of Germany

[73] Assignee: Hoechst Aktiengesellschaft, Frankfurt am Main, Germany

[22] Filed: July 9, 1974

[21] Appl. No.: 486,780

[30] Foreign Application Priority Data
July 11, 1973 Germany............................ 2335193

[52] U.S. Cl.............................. 260/249.5; 424/249
[51] Int. Cl.².......................................... C07D 251/72
[58] Field of Search................................ 260/249.5

[56] References Cited
UNITED STATES PATENTS
3,840,537  10/1974  Garside et al...................... 260/249.5

Primary Examiner—John M. Ford
Attorney, Agent, or Firm—Curtis, Morris & Safford

[57] ABSTRACT

The invention relates to bis-triazinobenzimidazoles of the formula

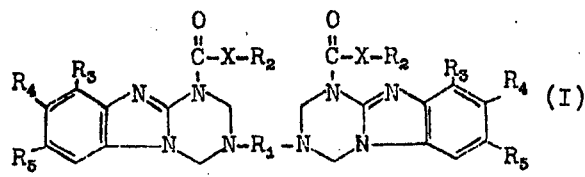

and to a process for preparing these compounds. The products of the invention are useful as pesticides, especially as fungicides on the plant system and as antiparasites.

8 Claims, No Drawings

BIS-TRIAZINOBENZIMIDAZOLES AND THEIR PREPARATION

The present invention relates to bis-triazinobenzimidazoles of the formula

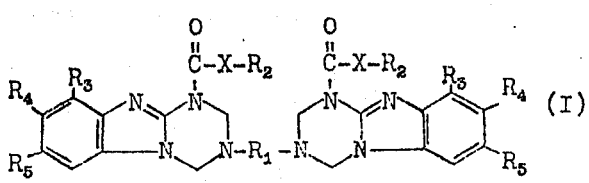

wherein $R_1$ is a straight-chain or branched ($C_2$–$C_{16}$)-alkylene group, a p,p'-dicyclohexyl-methylene group of the formula

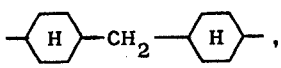

a 1,3- or 1,4-phenylene-dimethylene group or a 1,4-di-($C_2$–$C_4$)-alkyl-piperazine group, $R_2$ is a straight-chain or branched alkyl group of up to 4 carbon atoms, $R_3$ is hydrogen or halogen, preferably chlorine or bromine, $R_4$ is hydrogen or halogen, preferably fluorine, chlorine or bromine, or the phenylthio, the phenoxy, ethoxy, methyl or cyano group, $R_5$ is hydrogen or halogen, preferably chlorine or bromine and X is oxygen or sulfur.

As combinations of $R_3$, $R_4$ and $R_5$ those are preferred, in which at least one of the radicals $R_3$, $R_4$, $R_5$ is hydrogen, whereby, if $R_4$ represents phenylthio or phenoxy, $R_3$ and $R_5$ preferably represent hydrogen. Thus, the combinations are preferred in which $R_3$, $R_4$ and $R_5$ represent hydrogen, or in which $R_3$ and $R_5$ represent hydrogen and $R_4$ represents phenylthio, phenoxy, ethoxy, chlorine, fluorine, bromine, cyano or methyl or in which $R_4$ and $R_5$ represent hydrogen and $R_3$ is halogen. preferably chlorine, or $R_4$ is hydrogen and $R_3$ and $R_5$ are halogen, preferably bromine, or $R_3$ represents hydrogen and $R_4$ and $R_5$ are halogen, preferably chlorine. If X is sulfur, $R_3$, $R_4$ and $R_5$ preferably represent hydrogen.

The invention further relates to a process for preparing compounds of the formula I, which comprises reacting a benzimidazole of the formula

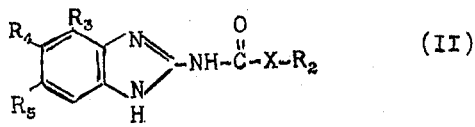

with a diamine of the formula
$$H_2N-R_1-NH_2 \qquad (III)$$

and formaldehyde.

A preferred variant of the process consists in suspending or dissolving the benzimidazole (II) in a solvent, adding one and a half molar amount of the diamine and adding, while stirring, a 2-molar to 4-molar amount of the aqueous formaldehyde solution. The reaction is preferably carried out at a temperature of from 0° to 80°C, especially of from 20° to 40°C, but the temperature range is not critical. In general, the reaction product is dissolved and may be separated in this solution from optionally present undissolved benzimidazole of the formula II, for example by simple filtration. By evaporating the solution and treating the residue with an inert solvent such as gasoline or by reprecipitation, for example from methylene chloride/gasoline, the bis-triazinobenzimidazole (I) can be isolated in pure form.

The reaction also takes place when using a deficiency of formaldehyde with formation of the final product I:

The solvents used for the reaction are especially moderately or slightly polar solvents, preferably those having low boiling points, such as methylene chloride, chloroform, carbon tetrachloride, benzene; ethers such as diethyl ether, diisopropyl ether and tetrahydrofurane; esters such as methyl acetate and ethyl acetate or ketones such as acetone or methylethyl ketone. Chloroform or methylene chloride are preferably used.

The benzimidazoles (II) used as starting materials may be prepared for example according to the method described in J. Am. Chem. Soc. 56, 144 (1934) for 2-methoxy-carbonylaminobenzimidazole by reaction of correspondingly substituted o-phenylene-diamines with S-methyl-iso-thio-urea-dicarboxylic acid dialkyl esters or with S-methyl-iso-thio-urea-dicarboxylic acid-di-thioalkyl esters. The preparation of the amines required for the reaction is also known in the literature.

The products of the invention are valuable chemotherapeutics and are suitable for the control of parasitic diseases of human beings and animals including parasitic diseases of laboratory animals.

The novel bis-triazinobenzimidazoles act against nematodes, for example ascarides, hook worms, oxyures, Nematospiroides dubius, Nippostrongylus, Heterakis and others, as well as against cestodes, for example Hymenolepis spec. in the case of laboratory animals. A particularly marked activity exists against gastro-intestinal strongyloides which attack above all ruminants. An infestation with these parasites causes considerable economical damages, therefore the products described herein represent valuable drugs.

Therefore, the invention also relates to pharmaceutical compositions, especially anthelmintic compositions which contain the bis-triazinobenzimidazoles (I) as active ingredients, generally in concentration of from 2 to 95% by weight. For oral administration 2 to 30 % by weight of a bis-triazinobenzimidazole (I) for parenteral administration 50 to 70 % by weight of a bis-triazinobenzimidazoles (I) are preferred.

For oral administration there are considered tablets, dragees, capsules, powders, granules or pastes which contain the active ingredients together with usual carriers and auxiliaries such as starch, cellulose powder, talcum, magnesium stearate, sugar, gelatin, calcium carbonate, finely divided silicic acid, carboxy methyl cellulose or similar substances. For oral administration there are furthermore considered suspensions having 1 to 50 % by weight of active ingredient, preferably 5 to 20 % by weight of active ingredient, or powders capable of being suspended in water having 1 to 80, preferably 40 to 70 % by weight of active ingredient.

For parenteral administration there are considered sterile solutions, for example oily solutions which are prepared by using sesame oil, castor oil or synthetic triglycerides, if desired by using surface-active agents such as sorbitane fatty acid esters. There may also be used aqueous suspensions which are prepared by using ethoxylated sorbitane-fatty acid esters, if desired with the addition of thickeners, as for example polyethylene-glycol or carboxymethyl cellulose.

In general, individual doses containing between 1 and 30 mg of active ingredient per kilogram of body weight of the infested organism are administered in the case of helminths, i.e. once to three times, if desired to five times daily. The dosage unit forms are pharmaceutical compositions each of which contains 50 to 1000 mg of active ingredient.

The compounds claimed are furthermore characterized by a fungicide action, especially on the plant system, so that they are also useful for combating the fungal pathogens which have already penetrated into the tissu of the plant. This is particularly important for those mycoses which have a long incubation time and which, after infestation, can no longer be controlled with the usual fungicides. These compounds have a broad spectrum of action including quite a number of important fungal pathogens which play an important part in agriculture, fruit, vine- and hop growing, horitculture and in ornamental plant growing; some of these genera may be mentioned by way of example: Fusicladium, Gloesporium, Cylindrosporium, Botrytis, Cercospora, Septoria, Mycosphaerella, Gladosporium, Colletotrichum, Thizoctonia, Fusarium, Cercosporella, Ustilago, Erysiphacea, Apergillacea, Scelerotinia as well as Verticillium.

The compounds claimed may also be used for the protection of stored fruits and vegetables against infestation with fungi (for example species of Fusarium-Penicillium).

Furthermore, they are suitable for application in the technical range, for example for the protection of textiles, wood, dyestuffs and paints against infestation with organisms causing rotting and other fungal organisms.

Therefore, the invention also relates to pesticides, especially fungicide agents which contain the bis-triazinobenzimidazoles of the general formula I as active ingredients, in general in concentrations of 2 to 90 % by weight, preferably 10 to 80 % by weight, in mixtures with the usual solid or liquid inert carriers, adhesives, wetting and dispersing agents and/or grinding auxiliaries.

They may be used as spray powders, emulsions, suspensions, dusts or granules. They may also be mixed with other fungicides, with which they form compatible mixtures.

As carriers there may be used mineral substances such as aluminum silicates, argillaceous earths, kaolin, chalks, siliceous chalks, talcum, kieselguhr or hydratized silicic acid, or preparations of these mineral substances with special additives, for example chalk greased with sodium stearate.

As carriers for liquid compositions there may be used all usual and suitable solvents, for example toluene, xylene, diacetone alcohol, cyclohexanone, isophorone, gasolines, paraffin oils, dioxane, dimethylformamide, dimethyl sulfoxide, ethyl acetate, tetrahydrofurane, chlorobenzene and other solvents.

Glue-like cellulose products or polyvinyl alcohols may be considered as adhesives.

As wetting agents there may be used all suitable emulsifiers such as oxethylated alkyl-phenols, salts of aryl- or alkylaryl-sulfonic acids, salts of oleylmethyl taurine, salts of oxethylated phenyl-sulfonic acids or soaps.

As dispersing agents there are suitable cellulose pitch (salts of the lignin-sulfonic acid), salts of the naphthalenesulfonic acid or salts of oleylmethyl taurine.

As grinding auxiliaries there may be used suitable organic or mineral salts such as sodium sulfate, ammonium sulfate, sodium carbonate, sodium bicarbonate, sodium thiosulfate, sodium stearate or sodium acetate.

The following Examples of preparation and application illustrate the invention.

A. EXAMPLES OF PREPARATION

EXAMPLE 1

57.3 g (0.3 mol) of 2-methoxycarbonylamino-benzimidazole were suspended in 900 ml of methylene chloride, mixed with 30 g (0.15 mol) of 1,12-diaminododecane and heated to 35°C. At this temperature 67.5 ml (0.8 mol) of a 35% formaldehyde solution were added dropwise, while stirring. The mixture was stirred for 1 hour at 38°C, then it was allowed to cool while stirring.

The non-reacted 2-methoxycarbonylamino-benzimidazole was suction-filtered (after drying 2.5 g), the aqueous layer was separated and the methylene chloride solution was dried over magnesium sulfate. After evaporation an oil was obtained which solidified when it was stirred with gasoline.

Yield: 82.2 g (87 % of the theory), Melting point: 94° – 96°C. 1,12-Bis-(1'-methoxycarbonyl-s-hexahydro-triazino-benzimidazole-3')-dodecane

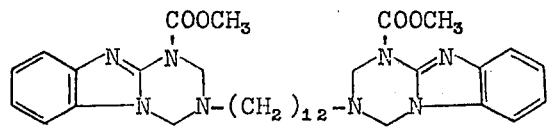

$C_{34}H_{46}N_8O_4$. MG 630.
calc.: C 64.8 %; H 7.3 %; N 17.78 %.
found: C 64.0 %; H 7.7 %; N 16.9 %.

The compound had in the infrared spectrum a characteristic carbonyl absorption at 1700 $cm^{-1}$, as well as double bond bands at 1600 and 1620 $cm^{-1}$.

EXAMPLE 2

25 g (0.0836 mol) of 2-methoxycarbonylamino-5-phenylthio-benzimidazole were suspended in 300 ml of methylene chloride, mixed with 8.35 g (0.0418 mol) of 1,12-diaminododecane and heated to 35°C.

At this temperature 18.8 ml (0.223 mol) of a 35 % formaldehyde solution were added dropwise. The mixture was stirred for 2 hours at 38°C, then it was cooled while stirring.

The non-reacted 2-methoxycarbonylamino-5-phenylthiobenzimidazole was suction-filtered (after drying 1 g), the aqueous layer was separated and the methylene-chloride solution was dried over magnesium sulfate.

After evaporation an oil was obtained from which the gas was extracted in high vacuum. It was dissolved again in methylene chloride and precipitated with gasoline.

When degasing in high vacuum a solid substance having a melting point of 69° – 70°C was obtained.

Yield: 18.1 g (56 % of the theory).

1,12-Bis-(1'-methoxy-carbonyl-7'-phenylthio-s-hexahydrotriazino-benzimidazol-3')-dodecane

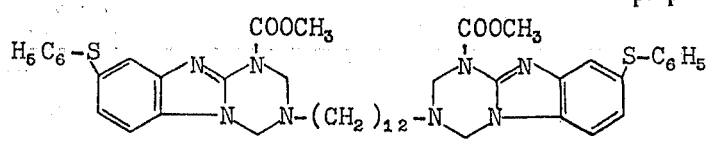

$C_{46}H_{54}N_8O_4S_2$. MG 846.

calc.: C 65.27 %; H 6.38 %; N 13.23 %.
found: C 65.4 %; H 7.0 %; N 13.1 %.

In the infrared spectrum the compound had a carbonyl absorption at 1700 cm$^{-1}$, as well as double bond bands at 1610 and 1580 cm$^{-1}$.

The substances listed in the following Table were prepared in analogy to the Examples (1) and (2):

Table

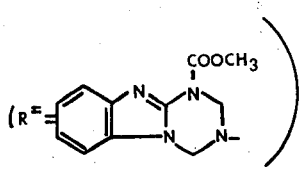

| Example | Formula | Melting point (°C) |
|---|---|---|
| 3 | R—(CH$_2$)$_3$—R | 155 |
| 4 | R—(CH$_2$)$_4$—R | 197–205 |
| 5 | R—(CH$_2$)$_5$—R | 119–122 |
| 6 | R—(CH$_2$)$_6$—R | 180–181 |
| 7 | R—⟨H⟩—CH$_2$—⟨H⟩—R | 85–90 |
| 8 | R—CH$_2$—⌬—CH$_2$—R | 86 |
| 9 | R—(CH$_2$)$_7$—R | 45 |
| 10 | R—(CH$_2$)$_8$—R | 137–176 not distilled oil |
| 11 | R—(CH$_2$)$_9$—R | 165 (decomp.) |
| 12 | R—(CH$_2$)$_{10}$—R | not distilled oil |
| 13 | R—(CH$_2$)$_{11}$—R | |
| 14 | 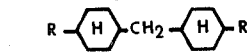 | 145–150 |
| 15 | 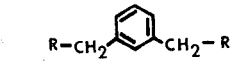 | 90–94 |
| 16 | 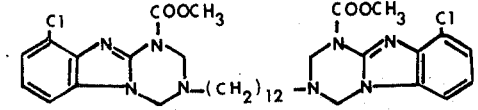 | 124–126 |
| 17 | 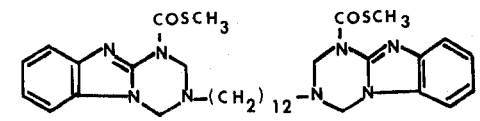 | 112–113 |
| 18 | 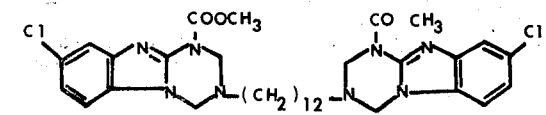 | not distilled oil |

Table-continued (R = benzimidazole-triazine core with COOCH₃)

| Example | Formula | Melting point (°C) |
|---|---|---|
| 19 | NC-substituted bis-benzimidazole-triazine linked by -(CH₂)₁₂- | not distilled oil |
| 20 | H₅C₆O-substituted bis-benzimidazole-triazine linked by -(CH₂)₁₂- | 70–80 |
| 21 | Br,Br-substituted bis-benzimidazole-triazine linked by -(CH₂)₁₂- | 167 |
| 22 | CH₃-substituted bis-benzimidazole-triazine linked by -(CH₂)₁₂- | 69 |
| 23 | Cl,Cl-substituted bis-benzimidazole-triazine linked by -(CH₂)₁₂- | 118–120 |
| 24 | R—(CH₂)₃—N(piperazine)N—(CH₂)₃—R | |

The following bis-triazino-benzimidazoles may be prepared in analogous way:

wherein $R_6$ has the following meanings:

25) $R_6$—(CH$_2$)$_3$—$R_6$
26) $R_6$—(CH$_2$)$_4$—$R_6$
27) $R_6$—(CH$_2$)$_5$—$R_6$
28) $R_6$—(CH$_2$)$_6$—$R_6$
29) $R_6$—(CH$_2$)$_7$—$R_6$
30) $R_6$—(CH$_2$)$_8$—$R_6$
31) $R_6$—(CH$_2$)$_9$—$R_6$
32) $R_6$—(CH$_2$)$_{10}$—$R_6$
33) $R_6$—(CH$_2$)$_{11}$—$R_6$
34) $R_6$—⟨C₆H₁₀⟩—CH$_2$—⟨C₆H₁₀⟩—$R_6$
35) $R_6$—CH$_2$—(m-phenylene)—CH$_2$—$R_6$
36) $R_6$—(CH$_2$)$_3$—N(piperazine)N—(CH$_2$)$_3$—$R_6$ a) 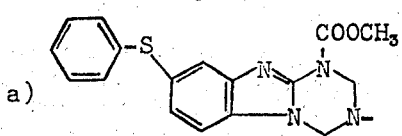

f) 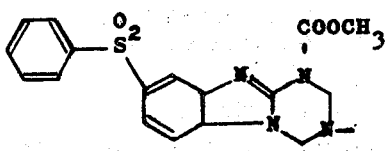

b) 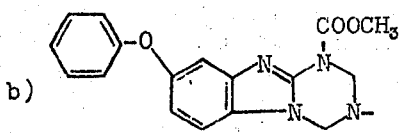

g) 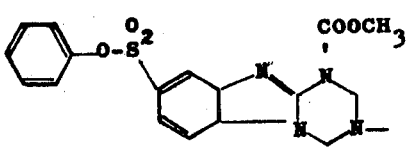

c) 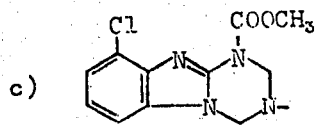

d) 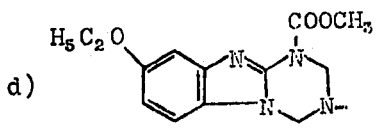

e) 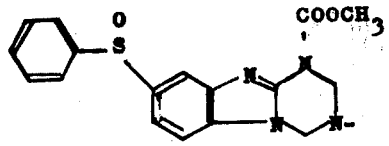

EXAMPLE 37:

Preparation of a 20% spray powder 12 g of active ingredient according to the Example of preparation (1) were pre-ground with 3 g of a highly dispersed silicic acid and then regularly mixed with 45 g of a mixture of 10 g of cellulose pitch, 49 g of magnesium-aluminum silicate, 8 g of a highly dispersed silicic acid, 7 g of polypropyleneglycol P 750 + highly dispersed silicic acid (1:1), 1 g of oleic acid methyl tauride. Thus, 60 g of a 20% spray powder were obtained.

B. EXAMPLES OF APPLICATION

1. Fungicidal action

Example I:

Sweet beet plants in the six-leaf stage were heavily infested with conidia of cercospora beticola causing beet leaf spot, sprayed to the drip off and placed in a climatized chamber which had a temperature of 25°C and a relative humidity of 100 %.

Two days after inoculation the plants were transferred to a green-house having a temperature of 25° to 26°C and a relative humidity of 85 – 90%. After a 6 days' stay in the green-house the plants were sprayed to the drip off with aqueous suspensions of the compounds according to the examples of preparation 3, 4, 5, 6, 1 and 7. A commercial composition on the basis of benomyl (1-N-butyl-carbamoyl-2-methoxycarbonylamino-benzimidazole) with 50% of active ingredient was used as comparative agent. The test was repeated four times as usual. The concentrations of application were 120, respectively 60 mg of active ingredient/liter of spray liquor.

After drying of the coating the plants were placed again in the green-house and after a time of incubation of 21 days they were examined to determine the degree of infestation with the leaf spot disease by visual inspection as usual. The degree of infestation was expressed in % of infested leaf surface referred to untreated infested control plants. The results are compiled in Table I.

EXAMPLE II:

Tomato plants of the type "Bonner Beste" were infected in a fully developed three-leaf stage with conidia of Cladosporium fulvum causing leaf mould, sprayed to the drip off and placed for 1 day in a climatized chamber which had a temperature of 25°C and a relative humidity of 100%. Then the plants were brought to a green-house which was adjusted to a temperature of 25° to 26°C and a relative humidity of 80 to 90%. After a time of infestation of 6 days the plants were sprayed to the drip off with aqueous suspensions of the compounds mentioned in Example I in concentrations of 120 and 60 mg of active ingredient per liter of spray liquor. Benomyl having the same concentrations of active ingredient was used as comparative agent.

After drying of the coating the plants were placed again in the green-house. After a time of infestation of 21 days they were examined to determine the degree of infestation with the leaf mould disease. It was estimated as usual by visual inspection and expressed in % of infested leaf surface referred to untreated infested control plants (Table I).

EXAMPLE III

Apple seedlings of the type EM IX were allowed to sprout and infested in the four-leaf stage with conidia of Fusicladium dendriticum causing apple scab and placed for 2 days in a climatized chamber having a temperature of 20°C and a relative humidity of 100%. The plants were brought to a green-house having a temperature of 18°C and a relative humidity of 90 to 95%.

After a time of infestation of 5 days the plants were sprayed four times to the drip off as usual with the compounds mentioned in Example I. The concentrations of application were 120 and 60 mg of active ingredient per liter of spray liquor.

After drying of the coating the plants were placed again in the green-house and after a time of incubation of 21 days they were examined to determine the degree of infestation with apple scab by visual inspection. It was expressed in % of infested leaf surface referred to untreated infested control plants (Table I).

the first or second form of administration depends on circumstances.

Special chemotherapeutical experiments were carried out on ewe's lambs having a weight of about 30 kg, each of which had been infested with different gastrointestinal nematodes. The test animals were kept in flagged boxes which are thoroughly cleaned every day. After termination of the prepatency period (time between infestation and pubescence of the parasites with beginning excretion of eggs and larvae) the egg number per gram of faeces was determined by an improved McMaster process according to Wetzel (Tierarztliche Umschau 6, 209–210 (1951)), and then the lambs were treated orally or parenterally. For this purpose the corresponding substance was suspended in about 10 ml of aqueous tylose. After the treatment the egg number per gram of faeces was determined again in several intervals according to the McMaster process, and the reduction in percent thereof as compared with the initial value before the treatment was calculated.

The Examples of the following Table illustrate the activity towards gastro-intestinal strongiloides.

From the small dosage unit required results a superior effect of the products described with regard to thiabendazoles (Eaton, L.G., O.H. Siegmund, A.D. Rankin u. R.G. Bramel, Texas Rep. Biol. Med. 27 (2): 693–708, 1969).

Table II

| Example | Compound according to Example of preparation | D.c.m. mg/kg | Administration | Effect |
|---|---|---|---|---|
| I | 1 | <5 | p.o. | 100 % |
| II | 2 | 5 | p.o. | >99 % |
| III | 12 | <5 | p.o. | 100 % |
| IV | 17 | 10 | p.o. | >99 % |
| V | thiabendazoles | 50 | p.o. | >99 % |

The tolerated maximum dose of the compounds of the invention is generally at 1600 mg/kg in the case of oral and subcutaneous administration.

D.c.m. means dosis curative minima.

What we claim is:

1. A compound of the formula

Table I

| Compound according to Example | % of leaf surface infested by *Cercospora* with mg of active ingredient per liter of spray liquor | | % of leaf surface infested by *Cladosporium* with mg of active ingredient per liter of spray liquor | | % of leaf surface infested by *Fusicladium* with mg of active ingredient per liter of spray liquor | |
|---|---|---|---|---|---|---|
| | 120 | 60 | 120 | 60 | 120 | 60 |
| 3 | 0 | 8 | 0 | 5 | 0 | 3 |
| 4 | 0 | 3 | 0 | 8 | 0 | 5 |
| 5 | 0 | 5 | 0 | 8 | 0 | 5 |
| 6 | 0 | 8 | 0 | 5 | 0 | 8 |
| 1 | 0 | 5 | 0 | 3 | 0 | 5 |
| 7 | 0 | 3 | 0 | 3 | 0 | 5 |
| benomyl | 0 | 5 | 0 | 3 | 0 | 5 |
| untreated infested plants | 100 | 100 | 100 | 100 | 100 | 100 |

2. Pharmaceutical action

In practice the administration of anthelminthics is effected orally or subcutaneously, whereby the use of

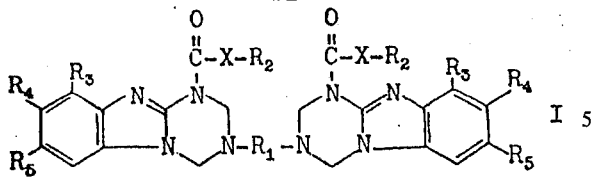

I wherein $R_1$ is a straight-chain or branched ($C_2$–$C_{16}$)-alkylene group, a p,p'-dicyclohexyl-methylene group of the formula

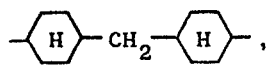

a 1,3- or 1,4-phenylene-dimethylene group or a 1,4-di-($C_2$–$C_4$)-alkyl-piperazine group, $R_2$ is a straight-chain or branched alkyl group having 1 to 4 carbon atoms, $R_3$ is hydrogen or halogen, $R_4$ is hydrogen or halogen, or the phenylthio, the phenoxy, ethoxy, methyl or cyano group, $R_5$ is hydrogen or halogen, and X is oxygen or sulfur.

2. A compound as claimed in claim 1, wherein $R_3$ is chlorine or bromine, $R_4$ is fluorine, chlorine or bromine and $R_5$ is chlorine or bromine.

3. Process for the preparation of compound of the formula I as claimed in claim 1, wherein a benzimidazole of the formula

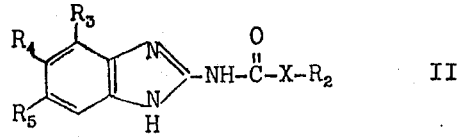

II is reacted with a diamine of the formula $H_2N$—$R_1$—$NH_2$ (III) and formaldehyde.

4. The compound defined in claim 1 which is 1,12-bis-(1'-methoxycarbonyl-s-hexahydrotriazinobenzimidazole-3')-dodecane.

5. The compound defined in claim 1 which is 1,12-bis-(1'-methoxycarbonyl-7'-phenylthio-s-hexahydrotriazinobenzimidazole-3')-dodecane.

6. The compound defined in claim 1 which is 1,10-bis-(1'-methoxycarbonyl-s-hexahydrotriazinobenzimidazole-3')-decane.

7. The compound defined in claim 1 which is 1,12-bis-(1'-methoxycarbonyl-7'-ethoxy-s-hexahydrotriazinobenzimidazole-3')dodecane.

8. The compound defined in claim 1 which is 1,12-bis-(1'-methoxycarbonyl-7'-cyano-s-hexahydrotriazinobenzimidazole-3')-dodecane.

* * * * *